(12) United States Patent
Yen et al.

(10) Patent No.: US 11,086,920 B2
(45) Date of Patent: Aug. 10, 2021

(54) SYSTEM AND METHOD FOR AUTOMATICALLY GENERATING CONCEPTS RELATED TO A TARGET CONCEPT

(71) Applicant: CEREGO, LLC., San Francisco, CA (US)

(72) Inventors: Michael A. Yen, Oakland, CA (US); Iain M. Harlow, Pleasant Hill, CA (US); Andrew Smith Lewis, Palo Alto, CA (US); Paul T. Mumma, Albany, CA (US)

(73) Assignee: CEREGO, LLC., San Francisco, CA (US)

( * ) Notice: Subject to any disclaimer, the term of this patent is extended or adjusted under 35 U.S.C. 154(b) by 450 days.

(21) Appl. No.: 15/977,952

(22) Filed: May 11, 2018

(65) Prior Publication Data

US 2018/0373791 A1 Dec. 27, 2018

Related U.S. Application Data

(60) Provisional application No. 62/523,364, filed on Jun. 22, 2017.

(51) Int. Cl.
| | | |
|---|---|---|
| *G06F 16/00* | (2019.01) | |
| *G06F 16/36* | (2019.01) | |
| *G09B 7/08* | (2006.01) | |
| *G09B 7/04* | (2006.01) | |
| *G06F 40/30* | (2020.01) | |

(52) U.S. Cl.
CPC ............ *G06F 16/367* (2019.01); *G06F 40/30* (2020.01); *G09B 7/04* (2013.01); *G09B 7/08* (2013.01)

(58) Field of Classification Search
CPC ........ G06F 16/367; G06F 40/30; G06F 16/21; G06F 16/211; G06F 16/9535; G09B 7/04; G09B 7/08
See application file for complete search history.

(56) References Cited

U.S. PATENT DOCUMENTS

| | | | |
|---|---|---|---|
| 6,652,283 B1 | 11/2003 | Van Schaack et al. | |
| 7,231,393 B1 * | 6/2007 | Harik | .................. G06F 16/3344 |
| 7,734,556 B2 * | 6/2010 | Tan | ........................ G06F 40/284 |
| | | | 706/45 |
| 7,827,125 B1 * | 11/2010 | Rennison | ............ G06F 16/3332 |
| | | | 706/14 |
| 7,877,371 B1 * | 1/2011 | Lerner | .................. G06F 16/355 |
| | | | 707/708 |

(Continued)

*Primary Examiner* — Noosha Arjomandi
(74) *Attorney, Agent, or Firm* — Keating and Bennett, LLP

(57) ABSTRACT

A method for generating a set of concepts related to a target concept includes accessing a set of candidate concepts, embedding the target concept and the set of candidate concepts in a semantic vector space, selecting one or more intermediate concepts from the set of candidate concepts in response to determining whether each embedded candidate concept in the set of embedded candidate concepts satisfies a predetermined relationship with the embedded target concept, and filtering the one or more intermediate concepts to yield the set of concepts related to the target concept. The method may further include generating a multiple-choice question in which the target concept corresponds to a correct answer choice and the set of concepts related to the target concept correspond to distractors.

17 Claims, 4 Drawing Sheets

(56) References Cited

U.S. PATENT DOCUMENTS

| | | | | |
|---|---|---|---|---|
| 7,912,702 | B2* | 3/2011 | Bennett | G06F 16/3344 704/9 |
| 8,180,804 | B1* | 5/2012 | Narayanan | G06F 16/24575 707/798 |
| 8,832,584 | B1 | 9/2014 | Agarwal et al. | |
| 9,286,526 | B1 | 3/2016 | Manohar | |
| 10,430,446 | B2* | 10/2019 | Liu | G06F 16/316 |
| 2004/0215587 | A1* | 10/2004 | Bertrand | G09B 7/04 706/59 |
| 2005/0058978 | A1 | 3/2005 | Benevento, II | |
| 2005/0138538 | A1 | 6/2005 | Raguseo | |
| 2006/0041538 | A1 | 2/2006 | King et al. | |
| 2006/0136821 | A1 | 6/2006 | Barabe et al. | |
| 2007/0288439 | A1* | 12/2007 | Rappaport | G06F 16/9535 |
| 2008/0104061 | A1* | 5/2008 | Rezaei | G06F 16/24575 |
| 2008/0126319 | A1* | 5/2008 | Bukai | G06F 16/951 |
| 2008/0281915 | A1* | 11/2008 | Elad | G06Q 30/02 709/204 |
| 2009/0012761 | A1* | 1/2009 | Bertrand | G09B 7/00 703/6 |
| 2009/0049067 | A1* | 2/2009 | Murray | G06F 40/30 |
| 2009/0112910 | A1* | 4/2009 | Picault | G06Q 30/02 |
| 2010/0190143 | A1 | 7/2010 | Gal et al. | |
| 2012/0296891 | A1* | 11/2012 | Rangan | G06F 16/3347 707/722 |
| 2013/0297419 | A1* | 11/2013 | Zimmerman, Jr. | G06Q 30/0256 705/14.54 |
| 2015/0269856 | A1 | 9/2015 | Kelson | |
| 2016/0133148 | A1 | 5/2016 | Hanks et al. | |
| 2016/0358488 | A1* | 12/2016 | Canter | G09B 5/02 |
| 2016/0358489 | A1* | 12/2016 | Canter | G09B 5/06 |
| 2017/0061324 | A1* | 3/2017 | Glass | G16H 10/20 |
| 2017/0083508 | A1* | 3/2017 | Dixon | G06F 40/58 |
| 2017/0098173 | A1* | 4/2017 | Kapur | G06N 5/02 |
| 2017/0124447 | A1* | 5/2017 | Chang | G06F 16/3334 |
| 2017/0206556 | A1* | 7/2017 | Dean | G06Q 30/0269 |
| 2018/0005540 | A1* | 1/2018 | Chetlur | G09B 5/02 |
| 2018/0052929 | A1* | 2/2018 | Liu | G06F 16/951 |
| 2018/0089191 | A1* | 3/2018 | Obasanjo | G06F 16/334 |
| 2018/0225379 | A1* | 8/2018 | Bhadury | G06F 7/026 |
| 2018/0232215 | A1* | 8/2018 | Campbell, Jr. | G06F 16/90332 |
| 2018/0357543 | A1* | 12/2018 | Brown | G06F 16/9024 |
| 2018/0357915 | A1* | 12/2018 | Harlow | G06N 7/005 |
| 2018/0365589 | A1* | 12/2018 | Lacoste | G16H 50/70 |
| 2019/0138615 | A1* | 5/2019 | Huh | G06F 16/38 |

\* cited by examiner

SYSTEM AND METHOD FOR AUTOMATICALLY GENERATING CONCEPTS RELATED TO A TARGET CONCEPT

RELATED APPLICATIONS

This patent application claims priority to and benefit of the filing date of U.S. Provisional Patent Application No. 62/523,364, entitled "A System for Automatically Generating Concepts Related to a Target," filed Jun. 22, 2017, which is hereby incorporated by reference in its entirety.

TECHNICAL FIELD

Embodiments of the present disclosure relate generally to learning systems and more particularly to learning systems for automatically generating concepts related to a target concept.

BACKGROUND

Electronic learning technologies are commonly used to help students learn, develop skills, and enhance their understanding of certain subjects. For example, electronic learning technologies may provide a convenient way to take a course online. However, these technologies often provide the same curriculum for many or all the students in the course. For example, a given course may provide common lesson plans and/or performance assessments to the students (e.g., using the same quiz questions to test each student), regardless of each student's weaknesses, strengths, and/or cognitive learning abilities.

Students typically vary in the way they learn, how quickly they learn, and how they retain what they learn. As a result, the general "one-size-fits-all" approach provided to the students is often ineffective, inefficient, and/or cumbersome to the students. Students using the "one-size-fits-all" approach may apportion too much time reviewing subject matter that they know well at the expense of spending insufficient time reviewing subject matter that they know poorly. In addition, many students may be burdened with trying to identify their own weaknesses and strengths in a given subject matter. Further, students may put forth effort in determining how to apportion their time effectively to learn the subject matter. As a result, the students may struggle with such burdens, they may not perform well on exams, and they may become discouraged, leading to attrition—one of the most significant problems in education today.

DETAILED DESCRIPTION

Electronic learning technologies may encounter scenarios in which a target concept is provided, and it is desired to automatically identify additional concepts that are related to the target concept. For example, when generating a lesson plan (e.g., for a course and/or a class session), the target concept may correspond to the main topic of the lesson plan and the related concepts may correspond to sub-topics to be covered by the lesson plan. Similarly, when generating a multiple-choice quiz question, the target concept may correspond to the correct answer to the question and the related concepts may correspond to distractors (answer choices that appear viable to the user but are actually incorrect). As these examples illustrate, the particular relationship between the target concept and the related concepts may depend on the application and/or the user. For example, a difficult multiple choice question for a high-performing user may demand trickier distractors than an easy multiple choice question for a low-performing user.

Existing electronic learning technologies may lack the ability to automatically identify concepts that are related to a target concept, and/or may lack the ability to do so accurately and reliably. Likewise, human teachers may lack the ability to identify concepts that are related to a target concept in a robust, systematic manner. For example, human teachers generally design lesson plans, multiple-choice quiz questions, and other learning materials using an intuitive and/or creative process. Because such a process is generally not repeatable (e.g., it is not a result of following a rules-based and/or formulaic approach), human teachers frequently take measures to reduce the burdensome task of designing learning materials, e.g., by reusing multiple-choice questions and/or lesson plans, borrowing from other teachers and/or online resources, and/or the like. Similarly, human teachers rarely customize questions and/or lesson plans for individual students, create lesson plans for rarely encountered subjects, and/or the like. As a result, the lack of systems that are able to automatically identify concepts that are related to a target concept may be a disservice to students. Accordingly, it would be desirable to provide systems and methods for automatically identifying concepts that are related to a target concept.

Figure 1:
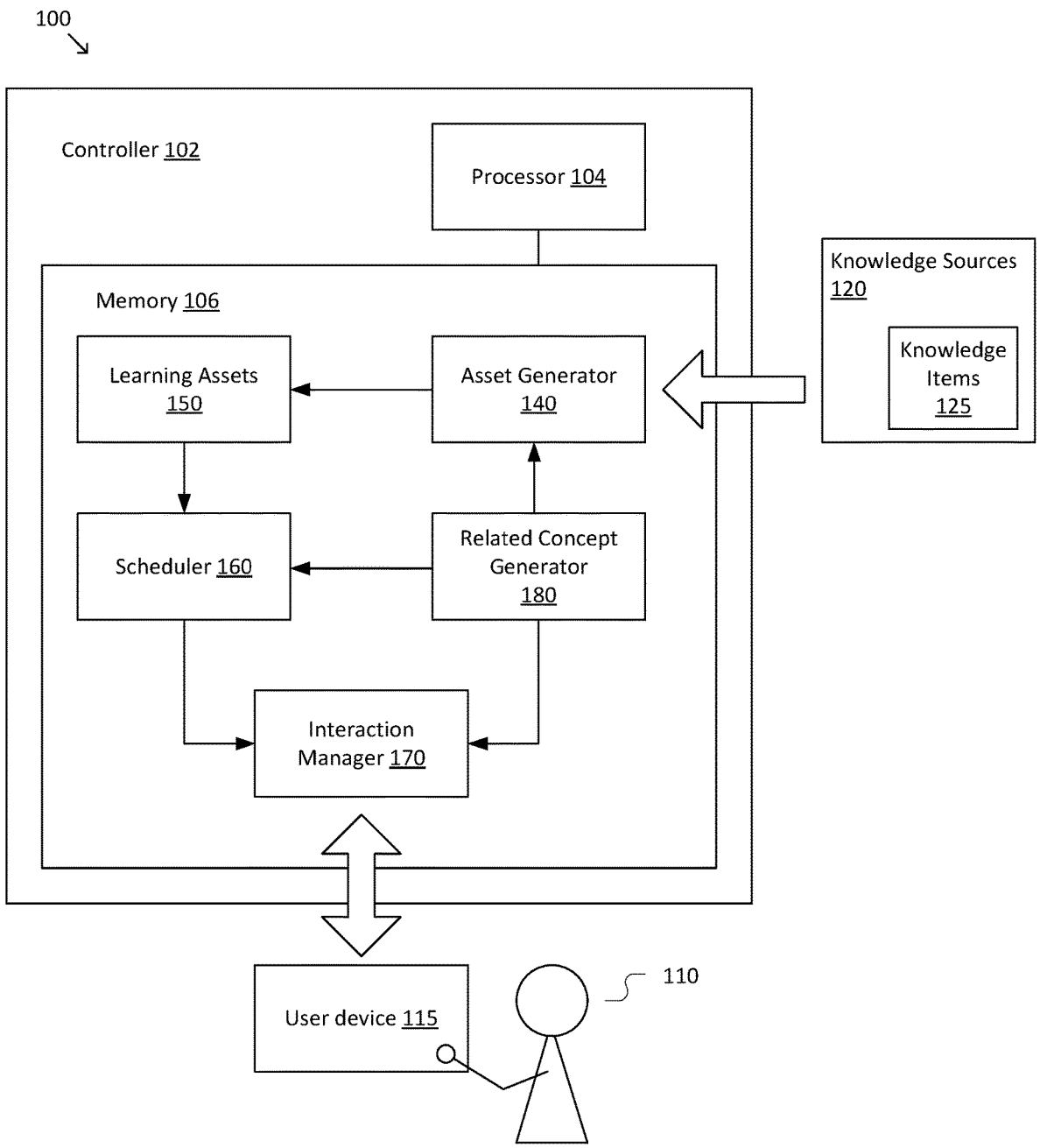
FIG. 1 is a simplified diagram of a learning system according to some embodiments.

FIG. 1 is a simplified diagram of a learning system 100 according to some embodiments. According to some embodiments, learning system 100 may be configured to facilitate knowledge acquisition by a user 110. In particular, learning system 100 may assist user 110 in acquiring knowledge from one or more knowledge sources 120 in furtherance of a learning objective. For example, the learning objective of user 110 may include a desire to learn about a topic, develop a skill, follow a procedure, learn a language, obtain a professional certification, satisfy continuing learning requirements, and/or the like. User 110 may be engaged in self-study and/or may be enrolled in a course along with other users of learning system 100, such as a school course (e.g., an elementary, high school, and/or college course), an institutional training course (e.g., a training course used by business, corporate, government, and/or military entities), and/or the like. In some embodiments, learning system 100 may include features similar to those described in U.S. patent application Ser. No. 15/836,631, entitled "Personalized Learning System and Method for the Automated Generation of Structured Learning Assets based on User Data," filed Dec. 8, 2017, which is hereby incorporated by reference in its entirety.

Illustrative examples of knowledge sources 120 may include textbooks, academic courses, lectures or seminars, encyclopedias, journal articles, instruction manuals, guidebooks, dictionaries, maps, recipes, and/or the like. Knowledge sources 120 may be represented in a variety of structured and/or unstructured digital formats, including but not limited to text, audio, and/or multimedia formats. In some embodiments, learning system 100 may store knowledge sources 120 locally and/or may access knowledge sources 120 remotely over a network (e.g., the Internet). In general, each of knowledge sources 120 includes one or more knowledge items 125, which correspond to a subset of learnable subject matter from knowledge sources 120 that is relevant to the learning objectives of user 110. For example, knowledge items 125 may include discrete concepts, facts, figures, graphs, images, multimedia content, processes, equations, formulas, and/or the like contained in knowledge sources 120.

To facilitate knowledge acquisition by user 110, learning system 100 may provide a series of learning interactions to user 110. The learning interactions may be intended to introduce user 110 to new knowledge items 125, to reinforce previously presented knowledge items 125, to assess the progress of user 110, to provide feedback to user 110, and/or the like. In some embodiments, sets of learning interactions may be grouped and/or arranged to form courses, modules, sub-modules, learning sessions (e.g., sets of learning interactions intended to be performed in a single sitting), and/or the like. In some embodiments, learning system 100 may schedule the learning interactions to achieve a desired outcome, such as long-term retention of knowledge items 125, peak short-term retention of knowledge items 125 (e.g., in preparation for a particular event or deadline, such as an exam or performance), and/or the like.

User 110 may access learning system 100 via a user device 115. User device 115 may correspond to a local terminal of learning system 100 and/or a remote node for accessing learning system 100 via a network (e.g., the Internet). For example, user device 115 may include a mobile device, a personal computer, a digital assistant, an electronic reader, a wearable electronic device, an Internet-of-Things (IoT) device, an augmented and/or virtual reality (AR/VR) device, and/or the like. In addition to user 110, other entities may access learning system 100 for a variety of purposes. For example, a teacher may access learning system 100 to monitor the progress of his or her students (e.g., user 110), an administrator of learning system 100 may access learning system 100 to monitor the performance of learning system 100, a content developer (e.g., a provider of knowledge sources 120) may access learning system 100 to evaluate the effectiveness of knowledge sources 120, a researcher may access learning system 100 to conduct academic studies based on data associated with learning system 100, and/or the like.

As depicted in FIG. 1, learning system 100 includes a controller 102 communicatively coupled to user device 115. In some embodiments, controller 102 may include a processor 104 (e.g., one or more hardware processors). Generally, processor 104 may include one or more general purpose central processing units (CPUs). Additionally or alternately, processor 104 may include at least one processor that provides accelerated performance when evaluating neural network models. For example, processor 104 may include a graphics processing unit (GPU), an application specific integrated circuit (ASIC), a field programmable gate array (FPGA), a tensor processing unit (TPU), a digital signal processor (DSP), a single-instruction multiple-data (SIMD) processor, and/or the like. Generally, such processors may accelerate various computing tasks associated with evaluating neural network models (e.g., training, prediction, pre-processing, and/or the like) by an order of magnitude or more in comparison to a general purpose CPU.

Controller 102 may further include a memory 106 (e.g., one or more non-transitory memories). Memory 106 may include various types of short-term and/or long-term storage modules including cache memory, static random access memory (SRAM), dynamic random access memory (DRAM), non-volatile memory (NVM), flash memory, solid state drives (SSD), hard disk drives (HDD), optical storage media, magnetic tape, and/or the like. In some embodiments, memory 106 may store instructions that are executable by processor 104 to cause processor 104 to perform operations corresponding to processes disclosed herein and described in more detail below.

Processor 104 and/or memory 106 may be arranged in any suitable physical arrangement. In some embodiments, processor 104 and/or memory 106 may be implemented on a same board, in a same package (e.g., system-in-package), on a same chip (e.g., system-on-chip), and/or the like. In some embodiments, processor 104 and/or memory 106 may include distributed, virtualized, and/or containerized computing resources. Consistent with such embodiments, processor 104 and/or memory 106 may be located in one or more data centers and/or cloud computing facilities.

In some embodiments, learning system 100 may include an asset generator module 140. As depicted in FIG. 1, asset generator module 140 extracts knowledge items 125 from knowledge sources 120 and generates learning assets 150 based on knowledge items 125. In general, learning assets 150 correspond to sets of knowledge items 125 selected based on a predetermined relationship. For example, a given learning asset 150 may include knowledge items 125 related to a particular topic or sub-topic. To illustrate, a learning asset 150 corresponding to a historical person may include a set of knowledge items 125 that identify the person's name, date of birth, historical significance, and/or the like. In some embodiments, learning assets 150 may be structured according to predefined templates that include a set of slots (e.g., name, date of birth, historical significance, etc.) with values that are populated using knowledge items 125. Illustrative examples of predefined templates may include association templates, vocabulary templates, passage templates, image and/or video region templates, sequence templates, and/or pattern templates, and/or the like. Examples of predefined templates are further described in U.S. patent application Ser. No. 15/836,631. In some embodiments, learning assets 150 may further include metadata that assists learning system 100 in using learning assets 150 effectively. For example, the metadata may include sequencing information, priority information, information identifying relationships among learning assets 150, and/or the like. It is to be understood that template-based learning assets as described above are merely illustrative, and that learning assets 150 may additionally or alternately correspond to various types of collections that facilitate storing and retrieving knowledge items 125 (e.g., databases, file systems, etc.).

Learning system 100 may further include a scheduler module 160 that schedules learning interactions between learning system 100 and user 110. In general, scheduler module 160 is configured to present learning interactions to user 110 in a manner that is conducive to efficiently achieving the learning objective of user 110. In this manner, the scheduling determinations made by scheduler module 160 may influence the rate at which user 110 progresses towards the learning objective. For example, scheduler module 160 may intelligently determine when to present a particular learning interaction to user 110, how often to reinforce concepts (e.g., by repetition and/or quizzing user 110), the presentation mode for the particular learning interaction (e.g., text-based presentation, multimedia-based presentation, question and answer session, flash cards, etc.), and/or the like. Similarly, scheduler module 160 may intelligently determine when to assess the performance of user 110, the type of assessment (e.g., multiple choice quiz, short answer essay, etc.), the topics to cover in a particular assessment, and/or the like. When presenting a set of learning interactions (e.g., a course, module, learning session, and/or the like), scheduler module 160 may intelligently determine the scope, content, and/or pacing of the course, the regularity and/or type of feedback user 110 receives, the content that is emphasized and/or de-emphasized in the course, and/or the like. In some embodiments, scheduler module 160 may make such scheduling determinations based on one or more statistical models, neural network models, rule-based models, and/or the like. Based on the scheduling determinations, learning system 100 may transmit notifications to user 110 (e.g., text message alerts, email messages, social media messages, and/or the like) to notify user 110 of particular times and/or ranges of time to access learning system 100 and/or to perform certain tasks, such as studying, practicing, training, and/or the like.

Learning system 100 may further include an interaction manager module 170 that manages learning interactions between learning system 100 and user 110. For example, interaction manager module 170 may generate and transmit a learning interaction to user device 115. When the learning interaction is a responsive learning interaction (e.g., an interaction that includes a response from user 110, such as a quiz question), interaction manager module 170 may further receive and handle the response from user device 115. In general, user 110 may provide responses in any suitable manner, such as via a user interface (e.g., mouse, keyboard, joystick, touchpad, and/or touchscreen inputs), verbal responses (e.g., spoken commands), physical responses (e.g., gestures), and/or the like.

Learning system 100 may further include a related concept generator module 180 that generates concepts that are related to a target concept. Related concept generator module 180 180 may receive the target concept from and/or provide the related concepts to one or more modules of learning system 100, such as asset generator module 140, scheduler module 160, interaction manager module 170, and/or the like. For example, related concept generator module 180 may include a distractor generator that communicates with interaction manager module 170 to generate related concepts that serve as distractors for multiple-choice quiz questions. Similarly, related concept generator module 180 may include a lesson plan generator that identifies a set of sub-topics to be covered in a lesson plan based on a main topic of the lesson plan. The identified sub-topics may be provided to asset generator module 140 to generate new learning assets 150 in accordance with the lesson plan and/or to scheduler module 160 to arrange existing learning assets 150 in accordance with the lesson plan. It is to be understood that these examples are merely illustrative, and that related concept generator module 180 may provide related concepts for a variety of other purposes associated with learning system 100.

Figure 2:
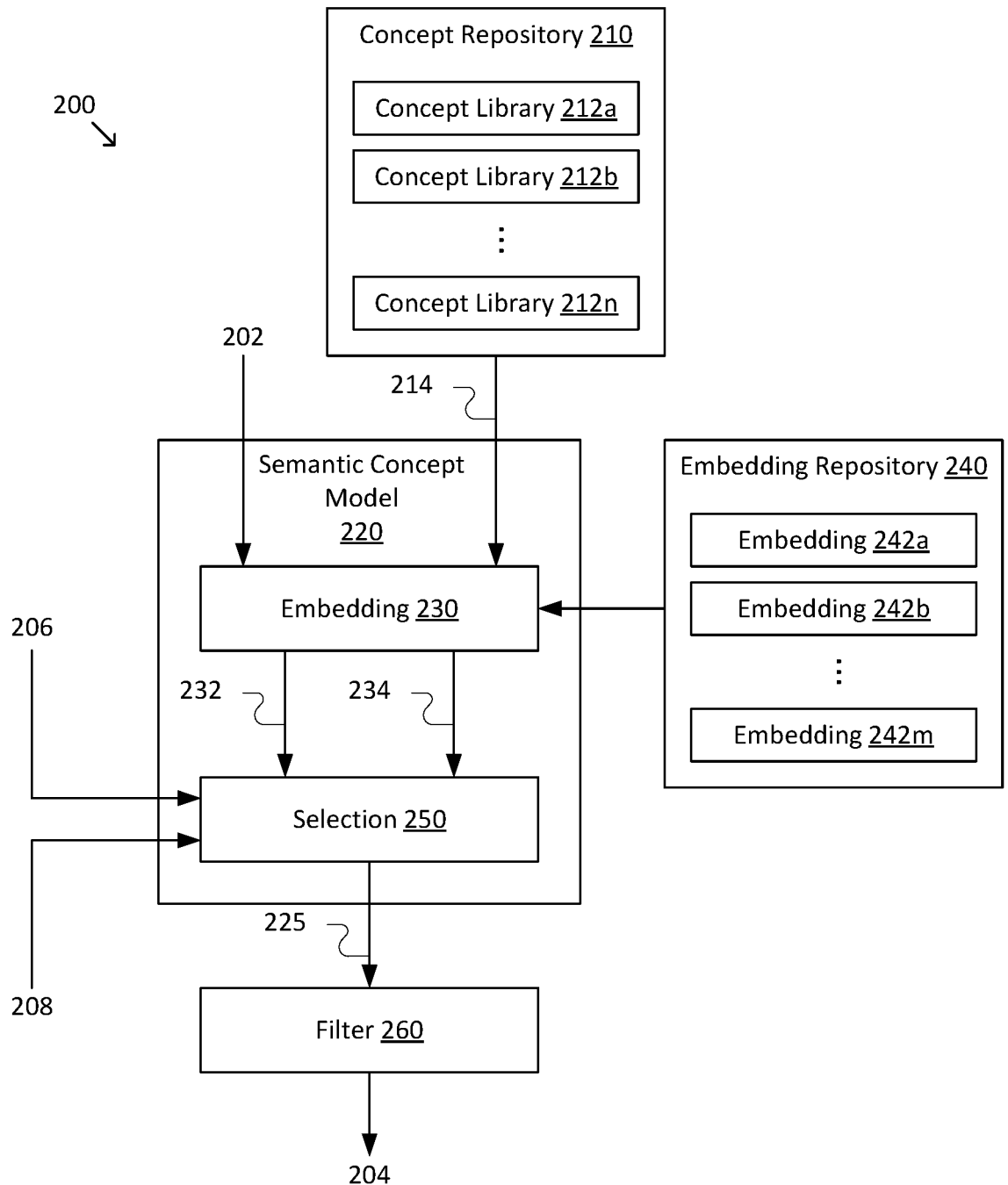
FIG. 2 is a simplified diagram of a related concept generator according to some embodiments.

FIG. 2 is a simplified diagram of a related concept generator 200 according to some embodiments. In some embodiments consistent with FIG. 1, related concept generator 200 may be used to implement related concept generator module 180. However, it is to be understood that related concept generator 200 may be implemented in contexts independent of learning system 100, including applications outside of electronic learning technologies.

As depicted in FIG. 2, related concept generator 200 receives a target concept 202 and generates a set of related concepts 204. Concepts (e.g., target concept 202 and/or related concepts 204) may generally include knowledge items, such as knowledge items 125, and/or other discrete items of information. In some embodiments, the concepts may be represented using data structures that include digital representations of the underlying concept (e.g., a fact, figure, topic, equation, etc.) and/or metadata associated with the concept (e.g., semantic and/or syntactic information associated with the concept). In some embodiments, related concept generator 200 may receive relationship information 206 that identifies the desired relationship between target concept 202 and related concepts 204. In some embodiments, related concept generator 200 may further receive user information 208 based on the capabilities of user 110. For example, user information 208 may include feedback provided by user 110 in response to previously generated related concepts 204 (e.g., previous answer choices provided by user 110 to multiple-choice questions). In this manner, related concept generator 200 may incorporate user information 208 to customize related concept generator 200 to a particular user 110.

In some embodiments, concepts (e.g., target concept 202 and/or related concepts 204) may be stored and/or represented using a representation based on the resource description framework (RDF), such as the RDF triple representation.

In some embodiments, related concept generator 200 may include a concept repository 210 that stores one or more concept libraries 212a-n. Concept libraries 212a-n are collections of concepts that serve as a source of candidate concepts 214 from which related concepts 204 are selected. In some embodiments, concept libraries 212a-n may correspond to domain-specific concept libraries that each include a subset of concepts related to particular domains and/or subject areas. Consistent with such embodiments, a given concept library (and/or multiple concept libraries) may be retrieved and used as a source of candidate concepts 214 based on the subject domain of target concept 202. For example, if target concept 202 is in the subject domain of astrophysics, related concept generator 200 may access domain-specific concept libraries covering the domains of astronomy, physics, science, and/or the like. In this manner, related concept generator 200 may operate more efficiently because concepts that are unlikely to satisfy the desired relationship to the target concept (e.g., sports-related concepts, in the example where the target concept is related to astrophysics) are not included among candidate concepts 214, thereby narrowing the scope of the search for related concepts 204.

Related concept generator 200 may further include a semantic concept model 220 that selects intermediate concepts 225 semantically related to target concept 202 from candidate concepts 214. As depicted in FIG. 2, semantic concept model 220 includes an embedding module 230 that embeds target concept 202 and candidate concepts 214 in a semantic vector space. In the semantic vector space, an n-dimensional vector is used to represent the meaning of a concept. An example of a semantic vector space is the 300-dimensional GloVe vector space. In some embodiments, embedding module 230 may embed target concept 202 and/or candidate concepts 214 using pretrained embeddings, lookup tables, and/or other suitable techniques for mapping concepts to vectors. Embedding module 230 yields an embedded target concept 232 and embedded candidate concepts 234.

In some embodiments, related concept generator 200 may include an embedding repository 240 that operates as a source of pretrained embeddings for embedding module 230. For example, embedding repository 240 may store a plurality of domain-specific embedding models 242a-m. Like concept libraries 212a-n, one or more of domain-specific embedding models 242a-m may be selected based on the subject domain of target concept 202. In some embodiments, using domain-specific embedding models 242a-m may improve the accuracy of related concept generator 200, as concepts may have different and/or ambiguous meanings depending on the domain-specific usage.

Related concept generator 200 may further include a selection module 250 that receives embedded target concept 232 and embedded candidate concepts 234 and selects intermediate concepts 225 that satisfy a predetermined relationship with target concept 202. In some embodiments, the selection may be based on displacement vectors between embedded target concept 232 and each of embedded candidate concepts 234 in the semantic vector space. For example, intermediate concepts 225 may correspond to embedded candidate concepts 234 with displacement vectors that match one or more selection criteria, such as a predetermined distance (and/or a range of distances), a predetermined direction (and/or a range of directions), and/or the like. The selection criteria may be fixed and/or may be dynamically determined, e.g., based on relationship information 206 and/or user information 208. To illustrate, when related concept generator 200 is used to generate distractors in multiple choice questions, relationship information 206 may identify a level of difficulty of the multiple choice question. When the level of difficulty is high, related concepts 204 should generally be very close to (but not synonymous with) target concept 202, making it difficult for the user to distinguish the correct answer from the distractors. Accordingly, the selection criteria may cause selection module 250 to select intermediate concepts 225 corresponding to a relatively small distance between embedded target concept 232 and embedded candidate concepts 234. On the other hand, when the level of difficulty is low, related concepts 204 should generally be farther in meaning from target concept 202, making it easy for the user to identify the correct answer. Accordingly, the selection criteria may cause selection module 250 to select intermediate concepts 225 corresponding to a relatively large distance between embedded target concept 232 and embedded candidate concepts 234. In a similar manner, user information 208 may influence the selection criteria. For example, when a user indicates that the multiple choice questions being generated are too easy and/or difficult, selection module 250 may scale the desired distance between embedded target concept 232 and embedded candidate concepts 234 to provide questions more suitable for the user's capabilities.

In addition to and/or instead of the displacement vector approach described above, selection module 250 may implement a neural network model that receives embedded target concept 232 and embedded candidate concepts 234 and predicts whether a given candidate concept satisfies a desired relationship with target concept 202. For example, the neural network model may assign a probability and/or score to each of embedded concepts 234. Based on the probability and/or score, selection module 250 may select intermediate concepts 225 that correspond to embedded candidate concepts 234 with probabilities and/or scores that exceed a predetermined threshold. In some embodiments, the neural network model may receive as additional inputs relationship information 206 and/or user information 208. In some embodiments, the neural network model may be trained according to a supervised learning process, in which a plurality of labeled training examples (e.g., sets of training target concepts, training candidate concepts, and training labels indicating whether the training candidate concepts satisfy the desired relationship with the training target concepts) are provided to the neural network model and used to iteratively update the parameters of the neural network model.

In some embodiments, selection module 250 may include a semantic space sampler to operate on a reduced sample of embedded candidate concepts 234. Operating on a reduced sample may improve the efficiency of related concept generator 200, particularly when the number of embedded candidate concepts 234 is large. In some embodiments, the reduced sample may be obtained by sampling embedded candidate concepts 234 according to the distribution of embedded candidate concepts 234 in the semantic vector space. For example, candidate concepts 234 may be sampled uniformly, or using any other suitable sampling distribution (e.g., Gaussian, Cauchy, and/or the like). In this manner, the reduced sample may correspond to a representative sample of embedded candidate concepts 234 in accordance with the sampling distribution. To illustrate one example, suppose there are thousands of embedded candidate concepts 234, but the goal of related concept generator 200 is to generate a set of just four distractors for a multiple-choice question. In this example, selection module 250 may operate on a representative sample of, say, 10 to 100 candidate concepts based on the distribution of embedded candidate concepts 234 in the semantic vector space, which may be a sufficient number of candidates to obtain the desired set of four distractors.

It is to be understood that the semantic space sampler described above may be used in contexts other than selection module 250. For example, the semantic space sampler may be used to select knowledge items to learn from a larger set of knowledge items distributed in a semantic space, to select quizzes from a quiz-bank (e.g., a set of quizzes distributed in a semantic space) to administer as a test, to extract portions from a document to produce a document summary, to select representative comments from a set of survey responses, and/or the like.

In some embodiments, related concept generator 200 may include a filter module 260 that filters intermediate concepts 225 to yield related concepts 204. According to some embodiments, the filtering criteria used by filter module 260 may be based on non-semantic features of intermediate concepts 225, such as syntactic and/or structural features. In some embodiments, the filtering criteria may be based on non-semantic features of target concept 202, such as part of speech, capitalization, phrase length, character-based features, and/or the like. For example, when generating distractors for a fill-in-the-blank, multiple-choice question and the missing word is a noun, filter module 260 may filter out intermediate concepts 225 that are not nouns and/or may convert intermediate concepts 225 to their noun form. Similarly, filter module 260 may filter intermediate concepts 225 based on their size (e.g., the number of words in a phrase, the dimensions of an image, the length of a video, and/or the like), data type, and/or the like. In some embodiments, filter module 260 may filter out duplicate and/or synonymous concepts. In some embodiments, filter module 260 may send intermediate concepts 225 (and/or a filtered subset of intermediate concepts 225) to a user, such as user 110, to curate intermediate concepts 225. In some embodiments consistent with FIG. 1, related concepts 204 from filter module 260 may be returned to learning system 100 for further processing (e.g., to generate a multiple-choice question, course curriculum, a lesson plan, and/or the like) and/or storage (e.g., to generate structured learning assets, such as structured learning assets 150). Additionally or alternately, related concepts 204 may be a system output in itself. For example, related concepts 204 may form a response to a query from a user, such as user 110.

Figure 3:
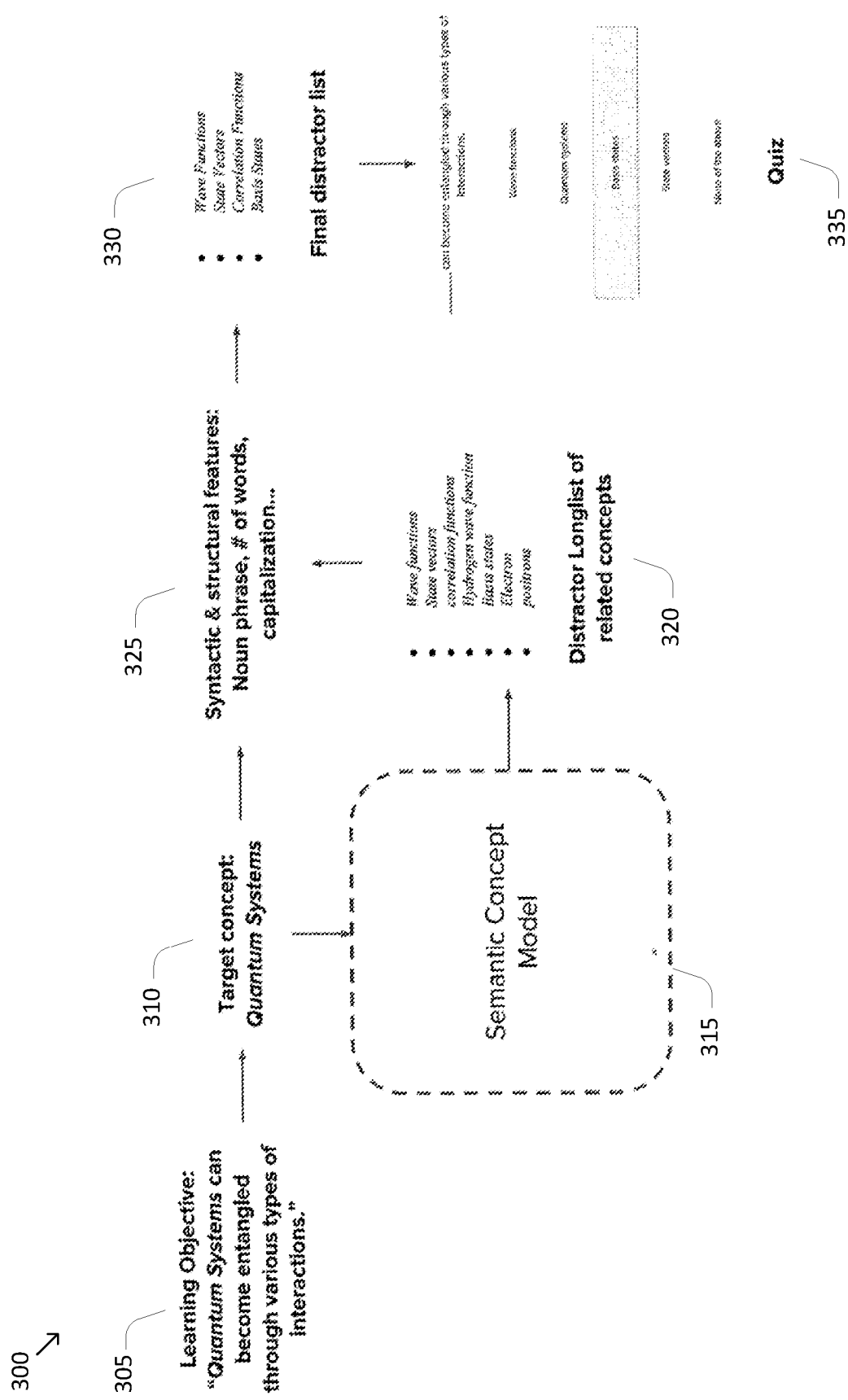
FIG. 3 is a simplified diagram of a distractor generator according to some embodiments.

FIG. 3 is a simplified diagram of a distractor generator 300 according to some embodiments. According to some embodiments consistent with FIGS. 1-2, distractor generator 300 may generally correspond to related concept generator module 180 and may be used to provide distractors for multiple-choice questions generated by interaction manager module 170.

Distractor generator 300 receives a learning objective 305 corresponding to a knowledge item that user 110 is being tested on. As illustratively depicted in FIG. 3, learning objective 305 includes the textual statement "quantum systems can become entangled through various types of interactions." In this example, the goal of learning system 100 is to formulate a multiple choice, fill-in-the-blank question based on learning objective 305. In particular, the question is "can become entangled through various types of interactions" and the correct answer is "quantum systems." The remaining, incorrect answer choices (i.e., distractors) are to be provided by distractor generator 300. The distractors are intended to serve as viable but incorrect answer choices to the multiple choice question. That is, the distractors should be sufficiently related to the correct answer that user 110 may be inclined to select them, particularly if user 110 does not know or has forgotten the underlying knowledge item. At the same time, the distractors should not be synonymous with the correct answer (and/or should not otherwise be a correct answer to the question) so as to render the question ambiguous.

Based on learning objective 305, distractor generator 300 determines a target concept 310. In the example depicted in FIG. 3, target concept 310 corresponds to the correct answer to the multiple choice question, which in this case is the phrase "Quantum Systems." Target concept 310 is provided to a semantic concept model 315 of distractor generator 300. In some embodiments consistent with FIGS. 1-2, semantic concept model 315 may generally correspond to semantic concept model 220. Consistent with such embodiments, semantic concept model 315 generates a set of intermediate concepts 320, which generally correspond to intermediate concepts 225. In the example depicted in FIG. 3, intermediate concepts 320 correspond to a subset of concepts from a set of candidate concepts, such as candidate concepts 214, that satisfy a predetermined relationship with target concept 310. In particular, the intermediate concepts 320 depicted in FIG. 3 correspond to candidate concepts that have meanings that are close to, but not synonymous with, the target concept of "Quantum Systems." For example, each of intermediate concepts 320 has a direct, proximate relationship to quantum systems (e.g., "wave functions," "state vectors," "correlation functions," and "basis states" are used to mathematically define particle states in quantum systems, "electrons" and "positrons" are examples of particles that exhibit quantum behaviors, etc.) but are not identical or confusingly close in meaning to the phrase "quantum systems." In particular, none of intermediate concepts 320 would result in a factually correct statement when input into learning objective 305, thereby avoiding ambiguity as to the correct answer choice.

Distractor generator 300 may further include a filter module 325 that filters intermediate concepts 320 based on non-semantic features of intermediate concepts 320, such as syntactic and/or structural features. As depicted in FIG. 3, target concept 310 corresponds to a noun phrase with two words, both capitalized. Consequently, filter module 325 may filter intermediate concepts 320 for concepts that likewise correspond to noun phrases with two words (and/or close to two words, e.g., a range of one to four words). Similarly, filter module 325 may modify intermediate concepts 320 to achieve capitalization consistent with target concept 310. Filter module 325 yields a final distractor list 330, which generally corresponds to related concepts 204. As depicted in FIG. 3, final distractor list 330 may be used to generate a multiple-choice quiz question 335 in which target concept 310 is the correct answer choice and final distractor list 330 provides the remaining incorrect answer choices.

It is to be understood that FIG. 3 is merely an example, and that many alternative and/or additional configurations are possible. In some embodiments, intermediate concepts 320 and/or final distractor list 330 may be provided to a user, such as user 110, to allow the user to curate the related concepts. To illustrate, the user may determine that the concept "state vectors" has little value as a distractor because, although generally related to "quantum systems," it is too easy to eliminate as a viable answer choice given the context of the question. Accordingly, the user may remove and/or reject the concept "state vectors" from final distractor list 330. Additionally or alternately, the user may add concepts to final distractor list 330, such as the concept "binary systems" to test the user's ability to distinguish between quantum and binary systems. In some embodiments, distractor generator 300 may receive user information, such as user information 208, such as a history of user interactions with distractors generated by distractor generator 300. For example, the user information may indicate that the user consistently ignores certain concepts, such as the concept "correlation functions," when they are provided as distractors on a quiz question. Based on this user information, distractor generator 300 may determine that "correlation functions" is an ineffective distractor for the particular user and consequently may be less likely to include "correlation functions" in intermediate concepts 320 and/or final distractor list 330.

Figure 4:
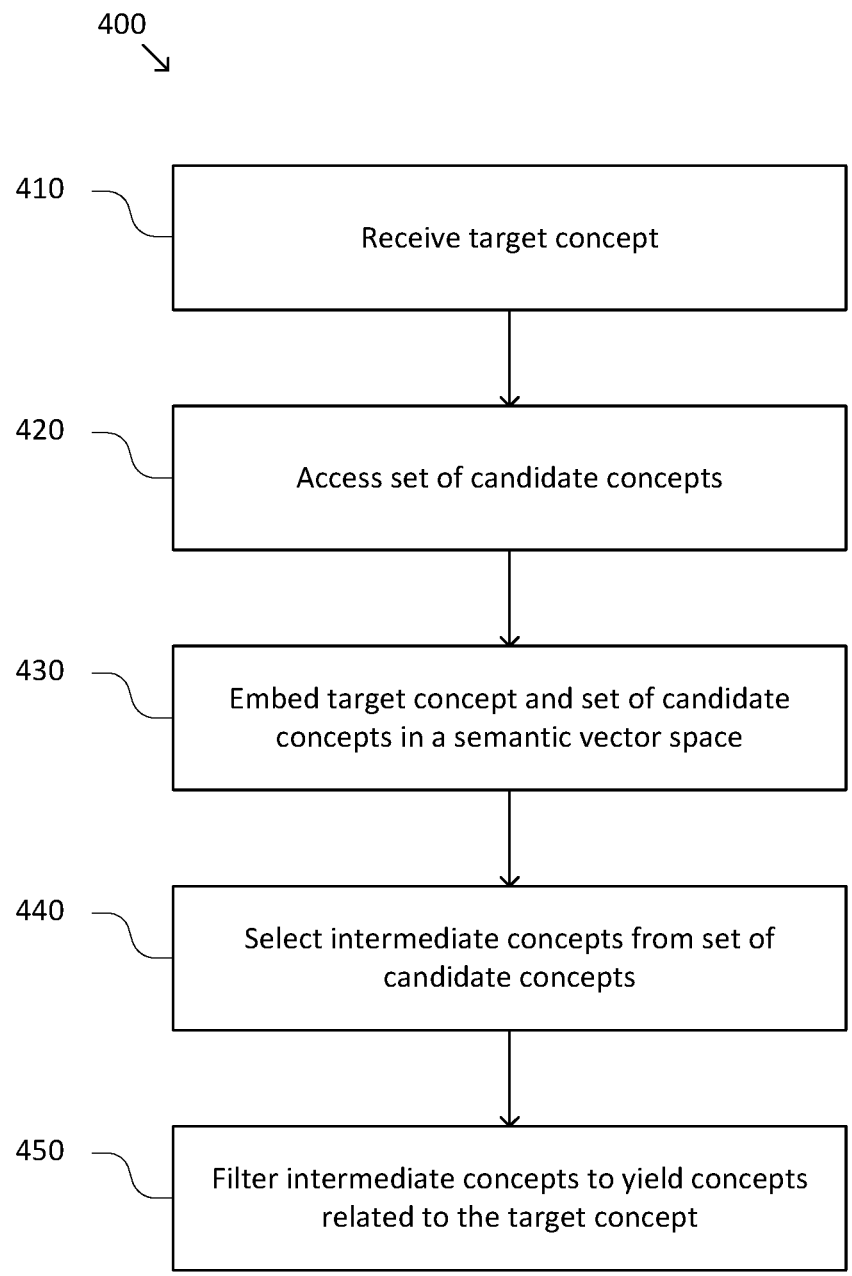
FIG. 4 is a simplified diagram of a method for generating concepts related to a target concept according to some embodiments.

FIG. 4 is a simplified diagram of a method 400 for generating concepts related to a target concept, such as target concept 202, according to some embodiments. In some embodiments consistent with FIGS. 1-3, method 400 may be performed using a processor of a learning system, such as processor 104 of learning system 100, during execution of a related concept generator, such as related concept generator module 180 and/or related concept generator 200. However, it is to be understood that method 400 may be performed in a variety of contexts other than learning system 100, including applications outside of electronic learning technologies.

At a process 410, a target concept is received. In some embodiments, the target concept may include text (e.g., a word, phrase, sentence, etc.), an image, audio, multimedia, and/or the like. Illustrative examples of the target concept include a topic of a course and/or lesson, a correct answer to a multiple-choice quiz question, and/or various other concepts for which a set of related concepts are desired. In some embodiments, the target concept may be provided by the learning system and/or various modules therein. For example, the learning system may include an interaction manager module, such as interaction manager module 170, that is responsible for generating the multiple-choice quiz question and accordingly may be a source of the target concept. In some embodiments, the target concept may be provided by a user, such as user 110. For example, the target concept may be associated with a query by the user to obtain a set of related concepts associated with the target concept.

At a process 420, a set of candidate concepts, such as candidate concepts 214, is accessed. In some embodiments, the set of candidate concepts may be accessed from a concept repository, such as concept repository 210, and or one or more concept libraries, such as concept libraries 212*a-n*. The set of candidate concepts may correspond to predefined concepts stored by the learning system. In some embodiments, candidate concepts may be added to the set of candidate concepts as knowledge sources, such as knowledge sources 120, are added to the learning system. In some embodiments, a particular concept library may be selected from a plurality of concept libraries based on, for example, the subject domain of the target concept, as discussed previously with reference to FIG. 2.

At a process 430, the target concept and the set of candidate concepts are embedded in a semantic vector space. In some embodiments, the embedding may be performed using an embedding module, such as embedding module 230. In some embodiments, the embedding module may apply pretrained embeddings that map concepts to corresponding semantic vectors in the semantic vector space, e.g., using a lookup table. In some embodiments, the embedding module may use one or more domain-specific embedding models based on the subject domain of the target concept and/or the set of candidate concepts. For example, the domain-specific embedding models may be selected from a plurality of domain-specific embedding models stored in an embedding repository.

At a process 440, one or more intermediate concepts are selected from the set of candidate concepts in response to determining whether each embedded candidate concept in the set of embedded candidate concepts satisfies a predetermined relationship with the embedded target concept. In some embodiments, the intermediate concepts may be selected based on a displacement vector between the embedded target concept and each of the set of embedded candidate concepts. In particular, the displacement vector may be compared to one or more selection criteria (e.g., a range of allowable distances and/or directions). According to some embodiments, the selection criteria may be determined and/or adjusted based on relationship information that identifies and/or quantifies the desired relationship between the related concepts and the target concept, user information that identifies and/or quantifies the capabilities of the user of the learning system, and/or the like. In some embodiments, the intermediate concepts may be selected using a neural network model that receives as inputs the embedded candidate concepts and the embedded target concept and predicts whether a given candidate concept satisfies the predetermined relationship, as previously discussed with reference to FIG. 2.

At a process 450, the one or more intermediate concepts are filtered to yield a set of related concepts. In some embodiments, the intermediate concepts may be filtered based on non-semantic features of the intermediate concepts and/or the target concepts, such as structural and/or syntactic features. In illustrative embodiments, the intermediate concepts may be filtered based on whether the length (e.g., number of words), part of speech, and/or the like, of the intermediate concepts match that of the target concept. Filtering may include removing intermediate concepts that do not satisfy the filtering criteria and/or modifying the intermediate concepts to comply with the filtering criteria (e.g., by adjusting the capitalization to match the target concept). In some embodiments, the one or more intermediate concepts and/or the set of related concepts may be provided to a user of the learning system (and/or other entities) to curate the set of related concepts, e.g., by removing, modifying, adding, and/or replacing entries in the set of related concepts.

Although illustrative embodiments have been shown and described, a wide range of modifications, changes and substitutions are contemplated in the foregoing disclosure and in some instances, some features of the embodiments may be employed without a corresponding use of other features. One of ordinary skill in the art would recognize many variations, alternatives, and modifications. Thus, the scope of the present application should be limited only by the following claims, and it is appropriate that the claims be construed broadly and in a manner consistent with the scope of the embodiments disclosed herein.

What is claimed is:

1. A method for generating a set of concepts related to a target concept, comprising: accessing a set of candidate concepts; embedding the target concept and the set of candidate concepts in a semantic vector space; selecting one or more intermediate concepts from the set of candidate concepts in response to determining whether each embedded candidate concept in the set of embedded candidate concepts satisfies a predetermined relationship with the embedded target concept; and filtering the one or more intermediate concepts to yield the set of concepts related to the target concept; wherein the determining whether each embedded candidate concept in the set of embedded candidate concepts satisfies the predetermined relationship includes determining whether a displacement vector between each embedded candidate concept and the embedded target concept is within a predetermined range of distances and a predetermined range of directions;

the predetermined range of distances and the predetermined range of directions are determined based on user information that identifies capabilities of a user that receives the set of concepts related to the target concept; and the user information is based on a history of user interactions with one or more previously generated sets of concepts.

2. The method of claim 1, further comprising generating a multiple-choice question in which the target concept corresponds to a correct answer choice and the set of concepts related to the target concept correspond to distractors.

3. The method of claim 1, further comprising generating a lesson plan in which the target concept corresponds to a main topic of the lesson plan and the set of concepts related to the target concept correspond to subtopics of the lesson plan.

4. The method of claim 1, wherein at the predetermined range of distances and the predetermined range of directions are determined based on relationship information that identifies a desired relationship between the target concept and the set of concepts related to the target concept.

5. The method of claim 1, wherein the one or more intermediate concepts are selected using a neural network model that predicts whether each candidate concept in the set of candidate concepts satisfies the predetermined relationship based on the embedded target concept and the set of embedded candidate concepts.

6. The method of claim 1, further comprising selecting, based on a subject domain of the target concept, a domain-specific concept library among a plurality of domain-specific concept libraries, the domain-specific concept library providing the set of candidate concepts.

7. The method of claim 1, further comprising selecting, based on a subject domain of the target concept, a domain-specific embedding model among a plurality of domain-specific embedding models, the domain-specific embedding model being used to embed the target concept and the set of candidate concepts in the semantic vector space.

8. The method of claim 1, wherein the one or more intermediate concepts are filtered based on non-semantic features of the one or more intermediate concepts.

9. The method of claim 1, further comprising providing the set of concepts related to the target concept to a user to curate the set of concepts.

10. A learning system comprising: a non-transitory memory; and one or more hardware processors coupled to the non-transitory memory and configured to execute instructions to cause the learning system to perform operations comprising: receiving a target concept; accessing a set of candidate concepts; embedding the target concept and the set of candidate concepts in a semantic vector space; selecting one or more intermediate concepts from the set of candidate concepts in response to determining whether each embedded candidate concept in the set of embedded candidate concepts satisfies a predetermined relationship with the embedded target concept; and filtering the one or more intermediate concepts to yield a set of related concepts that are related to the target concept; wherein
the determining whether each embedded candidate concept in the set of embedded candidate concepts satisfies the predetermined relationship includes determining whether a displacement vector between each embedded candidate concept and the embedded target concept is within a predetermined range of distances and a predetermined range of directions;
the predetermined range of distances and the predetermined range of directions are determined based on user information that identifies capabilities of a user that receives the set of concepts related to the target concept; and
the user information is based on a history of user interactions with one or more previously generated sets of concepts.

11. The learning system of claim 10, wherein the operations further comprise generating a multiple-choice question in which the target concept corresponds to a correct answer choice and the set of related concepts correspond to distractors.

12. The learning system of claim 10, wherein the operations further comprise generating a lesson plan in which the target concept corresponds to a main topic of the lesson plan and the set of related concepts correspond to subtopics of the lesson plan.

13. The learning system of claim 10, wherein the one or more intermediate concepts are selected using a neural network model that predicts whether each candidate concept in the set of candidate concepts satisfies the predetermined relationship based on the embedded target concept and the set of embedded candidate concepts.

14. The learning system of claim 10, wherein the predetermined relationship is determined based on one or more of relationship information that identifies a desired relationship between the target concept and the set of related concepts and the user information that identifies capabilities of thea user that receives the set of related concepts.

15. A non-transitory machine-readable medium having stored thereon machine-readable instructions executable to cause a learning system to perform operations comprising: identifying a target concept corresponding to a correct answer to a multiple-choice question; accessing a set of candidate concepts; embedding the target concept and the set of candidate concepts in a semantic vector space; selecting one or more intermediate concepts from the set of candidate concepts, the one or more intermediate concepts corresponding to one or more of the set of embedded candidate concepts that are usable as distractors for the multiple-choice question; filtering the one or more intermediate concepts to yield a set of distractors for the multiple-choice question; and providing the multiple-choice question with the set of distractors to a user of the learning system; wherein
the selecting of the one or more intermediate concepts from the set of candidate concepts includes determining whether a displacement vector between each embedded candidate concept and the embedded target concept is within a predetermined range of distances and a predetermined range of directions;
the predetermined range of distances and the predetermined range of directions are determined based on user information that identifies capabilities of a user that receives the set of concepts related to the target concept; and
the user information is based on a history of user interactions with one or more previously generated sets of concepts.

16. The non-transitory machine-readable medium of claim 15, wherein the one or more intermediate concepts are filtered based on at least one of a part of speech of the target concept, a number of words of the target concept, or a capitalization of the target concept.

17. The non-transitory machine-readable medium of claim 15, wherein the operations further comprise: receiving a user response to the multiple-choice question; and generating one or more second sets of distractors for one or more second multiple choice questions, the one or more second sets of distractors being customized to the user based on the user response.

* * * * *